(12) United States Patent
Feng et al.

(10) Patent No.: US 7,206,491 B2
(45) Date of Patent: Apr. 17, 2007

(54) LIGHT GUIDE DEVICE AND BACKLIGHT MODULE USING THE SAME

(75) Inventors: Di Feng, Beijing (CN); Ying-Bai Yan, Beijing (CN); Xing-Peng Yang, Beijing (CN); Hai-Tao Liu, Beijing (CN); Guo-Fan Jin, Beijing (CN); Shou-Shan Fan, Beijing (CN)

(73) Assignees: Tsinghua University, Haidian District, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/207,104

(22) Filed: Aug. 18, 2005

(65) Prior Publication Data

US 2006/0039670 A1 Feb. 23, 2006

(30) Foreign Application Priority Data

Aug. 20, 2004 (CN) ........................ 2004 1 0051215

(51) Int. Cl.
*G02B 6/10* (2006.01)
(52) U.S. Cl. ...................... 385/146; 385/901
(58) Field of Classification Search ................ 385/146, 385/901
See application file for complete search history.

(56) References Cited

U.S. PATENT DOCUMENTS

| | | | |
|---|---|---|---|
| 5,779,337 A | 7/1998 | Saito et al. | |
| 5,999,685 A * | 12/1999 | Goto et al. | 385/146 |
| 6,129,439 A | 10/2000 | Hou et al. | |
| 6,130,730 A | 10/2000 | Jannson et al. | |
| 6,633,722 B1 * | 10/2003 | Kohara et al. | 385/146 |
| 2002/0145860 A1 | 10/2002 | Lee | |
| 2005/0180720 A1 * | 8/2005 | Hara et al. | 385/146 |

* cited by examiner

*Primary Examiner*—Sarah Song
(74) *Attorney, Agent, or Firm*—Morris Manning & Martin LLP; Tim Tingkang Xia, Esq.

(57) ABSTRACT

A light guide device (60) and a backlight module using the same. The light guide device includes: an incident surface (61); an emitting surface (64) adjacent to the incident surface; a reflecting surface (62) opposited to the emitting surface; a plurality of first V-shaped structures (644) formed on the emitting surface; and a plurality of second V-shaped structures (622) formed on the reflecting surface and perpendicular to the first V-shaped structures, wherein respective heigths of the second V-shaped structures increase with increasing distance from the incident surface and respective distances between adjacent second V-shaped structures decrease with increasing distance from the incident surface. The light guide device of the present invention does not need optical elements, and thus has a simple structure. A backlight module using the same light guide plate is also provided.

20 Claims, 10 Drawing Sheets

LIGHT GUIDE DEVICE AND BACKLIGHT MODULE USING THE SAME

FIELD OF THE INVENTION

The present invention relates to a light guide device and a backlight module, and particularly to an edge light type backlight module for use in a liquid crystal display (LCD) or the like display devices.

BACKGROUND

In a liquid crystal display device, the liquid crystal is a substance that does not itself radiate light. Instead, the liquid crystal relies on receiving light from a light source in order to display images and data. In a typical liquid crystal display device, a backlight module powered by electricity supplies the needed light.

Figure 18:
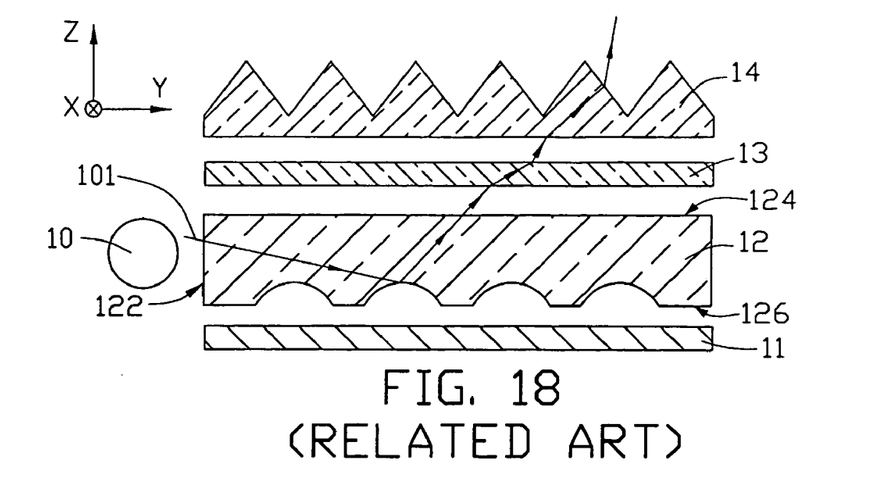
FIG. 18 is a schematic, exploded, cross-sectional view of a first conventional backlight module of related art.

Referring to FIG. 18, a typical backlight module includes a light source 10, a light guide device 12, and a plurality of optical correcting elements. The light guide device 12 includes an incident surface 122 adjacent to the light source 10, an emitting surface 124 located at the top surface of the light guide device 12 and adjacent to the incident surface 122, and a reflecting surface 126 opposite to the emitting surface 124. The optical correcting elements include a reflective sheet 11 positioned under the reflecting surface 126 for reflecting light back into the light guide device 12 again, a diffusion sheet 13 positioned above the emitting surface 124 for diffusing emitted light and thereby avoiding a plurality of bright sections in the light guide device 12, and a brightness enhancement sheet 14 positioned above the diffusion sheet 13 for collimating the emitted light beams uniformly to improve the brightness. However, the optical correcting elements make the backlight module quite complicated and costly to manufacture.

The light guide device 12 converts the light source 10 into a surface light source, and is one of the key components of the backlight module. Generally, the light guide device 12 does not have a function of controlling the direction of light emitted therefrom. When the light source 10 emits a light 101, the light guide device 12 receives the light 101 via the incident surface 122, reflects the light 101 at the reflecting surface 126, and emits the light 101 from the emitting surface 124 in an oblique direction away the light source 10. The angle of emission is not in a direction perpendicular to the emitting surface 124. Therefore a plurality of optical correcting elements needs to be added to and matched with the light guide device 12, for controlling the emitting light beams to emit perpendicularly toward a liquid crystal plate (not shown).

Uniformly emitting light and uniform light emitting angles are considered to be the important design considerations of a light guide device. If a light guide device can control a plurality of the emitting light beams to emit uniformly and perpendicular to the emitting surface thereof, or to emit within an appropriate light emitting angle range, the light guide device can realize the function of the conventional backlight module without the need for adding a plurality of optical correcting elements to the backlight module.

Figure 19:
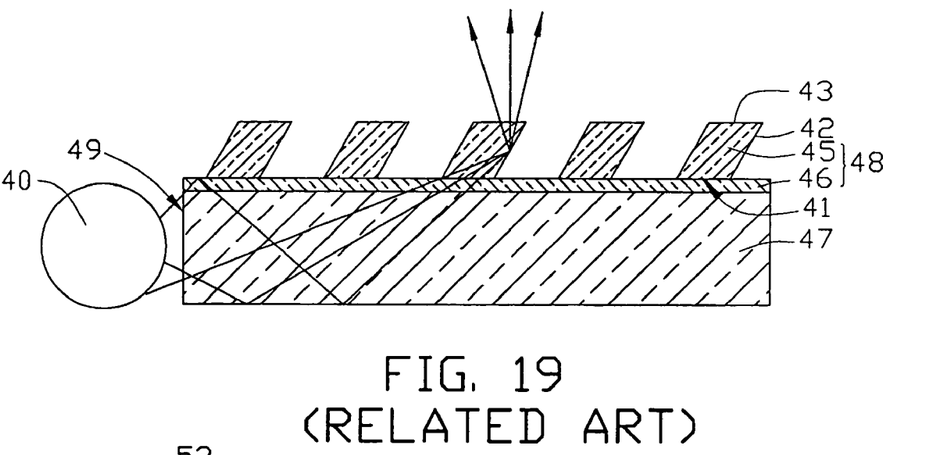
FIG. 19 is a schematic, cross-sectional view of a second conventional backlight module of the related art.

A conventional backlight module which can control the light emitting angle is shown as FIG. 19. The backlight module includes a light source 40, a light guide device 47 having a incident surface 49, and a transparent reflecting means 48 in optical contact with the light guide device 47.

The reflecting means 48 includes an optional adhesion promoting layer 46, and an array of microprisms 45 formed on the layer 46. Light reflects through the light guide device 47 via total internal reflection, enters the microprisms 45 by way of light input surfaces 41 thereof, reflects off sidewalls 42 of the microprisms 45, and exits the microprisms 45 through emitting surfaces 43 thereof as a spatially directed light source. However, the reflecting means 48 make the backlight module high rather complicated in structure and costly to manufacture. In particular, the light guide device 47 is difficult to mass produce by way of mold injection technology.

Figure 20:
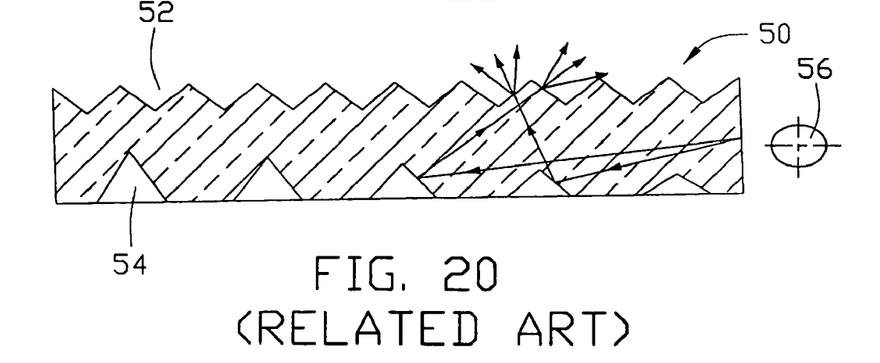
FIG. 20 is a schematic, cross-sectional view of a conventional light guide device of the related art.

A conventional light guide device is shown in FIG. 20. The light guide device 50 includes a body for guiding light transmitted from a light source 56. The body has a plurality of recesses 54 formed on a bottom surface thereof, and a plurality of light collecting grooves 52 formed in a direction parallel to the light source 56 on a top surface thereof. Each of the recesses 54 defines a polyhedral horn shape. Each of the grooves 52 has a V-shape in a sectional view that is taken along a direction parallel to the light source 56. Respective sizes of the recesses 54 increase with increasing distance from the light source 56, and respective distances between adjacent recesses 54 decrease with increasing distance from the light source 56. The plurality of recesses 54 on the bottom surface of the light guide device 50 and the plurality of V-shaped grooves 52 on the top surface of the light guide 50 can improve a brightness of the light and reduce a range of emitting angles of the light. However, the light guide device 50 cannot control a plurality of the emitting light beams to emit uniformly and perpendicular to the top surface of the light guide device 50. Therefore, the light guide device 50 generally still needs to have a plurality of optical correcting elements to be added in order to realize the desired function of a conventional backlight module.

What is needed, therefore, is a light guide device which can control a plurality of emitting light beams to emit uniformly and perpendicular to an emitting surface thereof, and which can realize the function of a conventional backlight module without having to add a plurality of optical correcting elements thereto.

SUMMARY

The present invention provides a light guide device. A preferred embodiment of the light guide device includes: an incident surface, an emitting surface adjacent to the incident surface, a reflecting surface opposited to the emitting surface, a plurality of first V-shaped structures formed on the emitting surface, and a plurality of second V-shaped structures formed on the reflecting surface and perpendicular to the first V-shaped structures, wherein respective heigths of the second V-shaped structures increase with increasing distance from the incident surface and respective distances between adjacent second V-shaped structures decrease with increasing distance from the incident surface.

The light guide device may further include a plurality of third V-shaped structures regularly and periodically formed on the incident surface thereof in directions of parallel or perpendicular to the plurality of second V-shaped structures.

The light guide device may further include a high reflectivity film formed on the reflecting surface.

Preferably, the light guide device includes three sidewalls and the high reflectivity film formed on the three sidewalls thereof.

The present invention also provides a backlight module using the same light guide device. A preferred embodiment of the backlight module includes a light source, a light guide device, having: an incident surface adjacent to the light source, an emitting surface adjacent to the incident surface, a reflecting surface opposited to the emitting surface, a plurality of first V-shaped structures formed on the emitting surface, a plurality of second V-shaped structures formed on the reflecting surface and perpendicular to the first V-shaped structures, wherein respective heigths of the second V-shaped structures increase with increasing distance from the incident surface and respective distances between adjacent second V-shaped structures decrease with increasing distance from the incident surface.

Compared with conventional light guide device, the preferred light guide device of the present invention having two different V-shaped structures respectively on the emitting surface and the reflecting surface thereof. The second V-shaped structures enable the light guide plate to control the emitting light beams to emit uniformly and perpendicular to the emitting surface thereof. The light guide plate does not need a plurality of optical elements, and thus has a simple structure. In addition, the third V-shaped structures can eliminate a plurality of shadows formed adjacent to the incident surface. Furthermore, the high reflectivity film can improve a light energy utilization rate. Therefore, the light guide plate can be advantageously applied in backlight module of liquid crystal display devices.

Other advantages and novel features will become more apparent from the following detailed description of preferred embodiments when taken in conjunction with the accompanying drawings, in which:

DETAILED DESCRIPTION OF THE PREFERRED EMBODIMENTS

Reference will now be made to the drawings to describe preferred embodiments of the present invention in detail.

Figure 1:
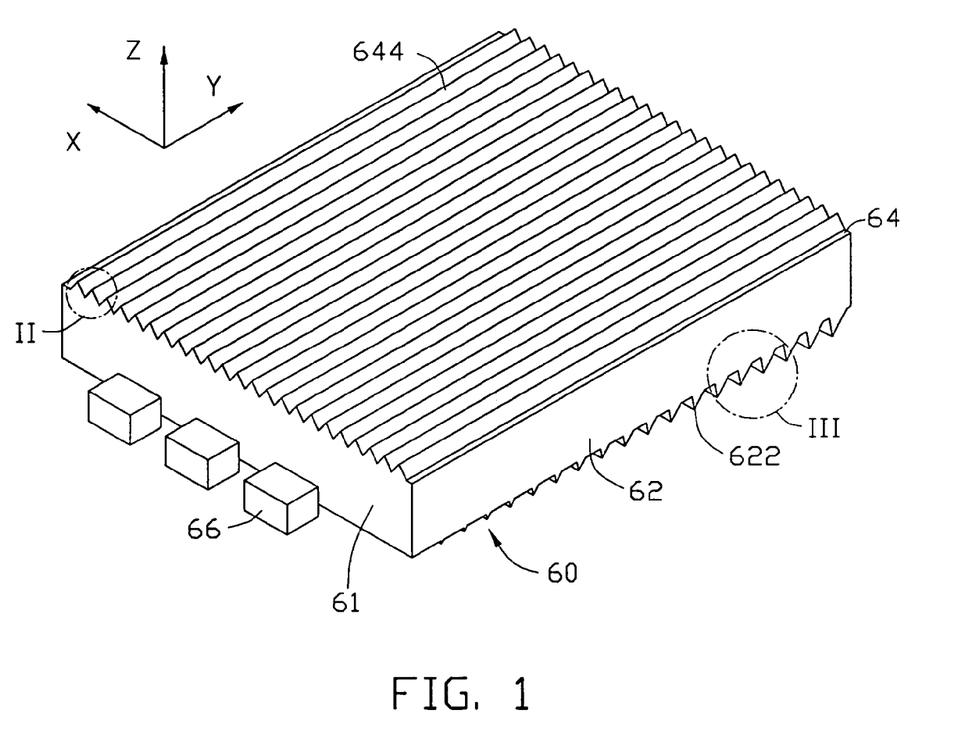
FIG. 1 is an isometric view of a light guide device according to a first preferred embodiment of the present invention.

Referring to FIG. 1, a light guide device 60 of a backlight module of a display device in accordance with a first preferred embodiment of the present invention is shown. The light guide device 60 has a flat body which includes an incident surface 61 located at a sidewall of the light guide device 60, an emitting surface 64 located at the top surface of the light guide device 60 adjacent to the incident surface 61, a reflecting surface 62 opposite to the emitting surface 64, a plurality of first V-shaped protruding structures 644 formed at the emitting surface 64 in a direction perpendicular to the incident surface 61, and a plurality of second V-shaped protruding structures 622 formed at the reflecting surface 62 in a direction parallel to the incident surface 61. The second V-shaped protruding structures 622 are perpendicular to the first V-shaped protruding structures 644.

Figure 2:
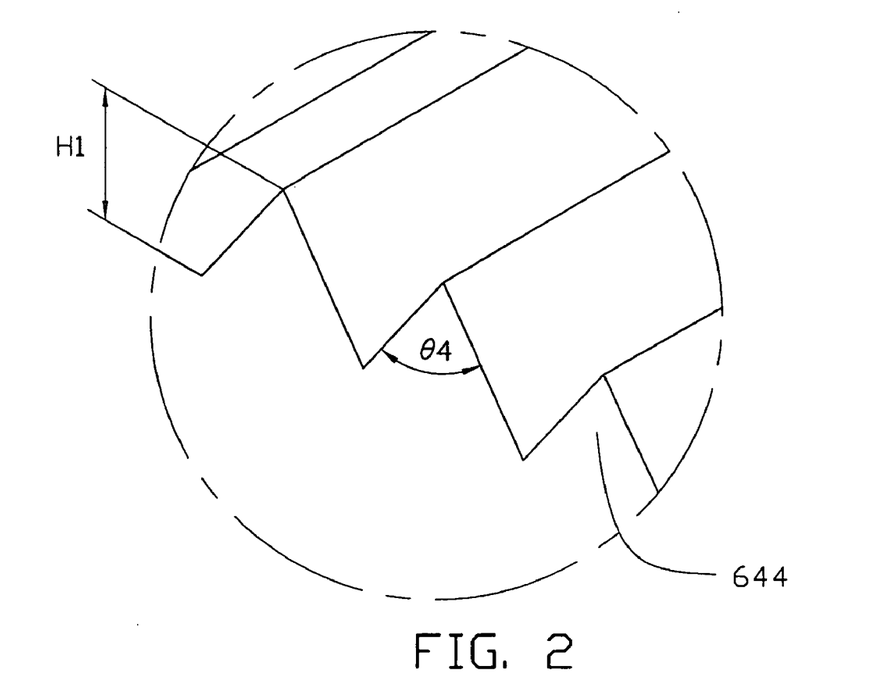
FIG. 2 is an enlarged view of a circled portion II of FIG. 1.

Referring to FIG. 1 and FIG. 2, the first V-shaped protruding structures 644 extend out of the emitting surface 64 regularly and periodically in a direction parallel to a Y-axis and parallel to each other. The shape of each first V-shaped protruding structures 644 is a long V-shaped projection having a uniform height. Each of the first V-shaped protruding structures 644 has a rod-shape in a Y-axis sectional view, and a V-shape in a Z-axis sectional view. In the Z-axis sectional view, each of the first V-shaped structures 644 has an apex angle θ4. The first V-shaped protruding structures 644 have a same height H1 and a same size. In the first preferred embodiment, the angle θ4 of the first V-shaped protruding structures 644 is in the range from 70~120 degrees, and the height H1 of the first V-shaped protruding structures 644 is in the range from 0~200 micrometers. The first V-shaped protruding structures 644 can compress light emitting angles for reducing reflection and allowing emitted light to have an appropriate distribution. This can be achieved very effectively by controlling the height H1 and the apex angle θ4. The emitting surface 64 with the first V-shaped protruding structures 644 arranged thereon can provide a high level of brightness in addition to appropriate distribution of light provided via the reflecting surface 62.

Figure 3:
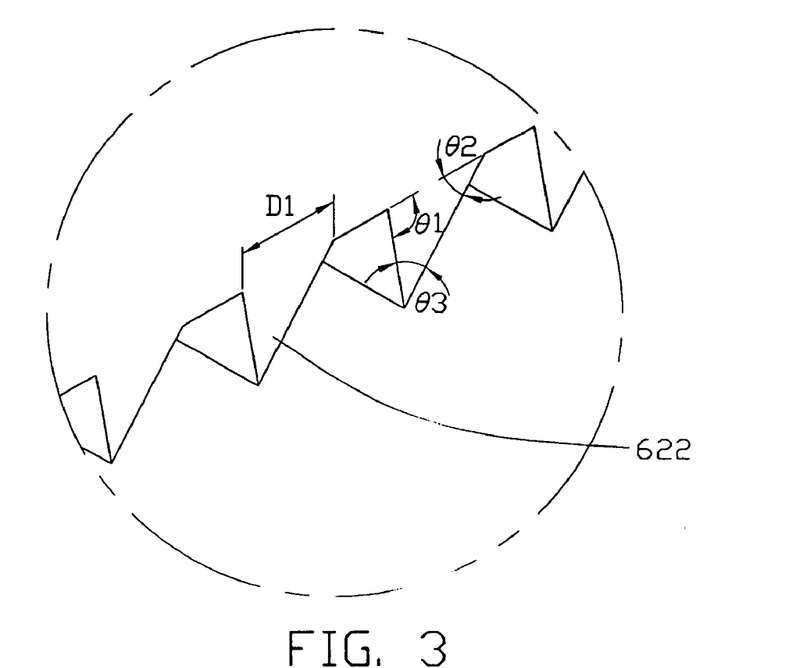
FIG. 3 is an enlarged view of a circled portion III of FIG. 1.

Referring so FIG. 1 and FIG. 3, the second V-shaped protruding structures 622 extend out of the reflecting surface 62 in a direction perpendicular so the Y-axis and parallel to each other. The second V-shaped protruding structures 622 have a same shape but different sizes. The shape of each second V-shaped protruding structure 622 is a long V-shaped projection having a uniform height along the projection. Each of the second V-shaped protruding structures 622 has a rod-shape in the X-axis sectional view, and a V-shape in the Y-axis sectional view. In the Y-axis sectional view, each of the second V-shaped protruding structures 622 includes a first base angle θ1, a second base angle θ2, and an apex angle θ3. In the first preferred embodiment, the first base angle θ1 is in the range from 70~90 degrees, the second base angle θ2 is in the range from 15~50 degrees, and the apex angle θ3 is in the range from 40~95 degrees.

Respective heights of the second V-shaped structures 622 progressively increase with increasing distance from the incident surface 61, and respective distances between adjacent second V-shaped structures 622 progressively decrease with increasing distance from the incident surface 61.

By controlling the angles θ1, θ2, θ3 of the second V-shaped structures 622, the emitting light beams can emit perpendicular to the emitting surface 64. If a part of emitting light intensity of the light guide device 60 is relatively high, sizes and densities of the second V-shaped structures 622 can be decreased for improving the uniformity of intensity of the emitting light. On the contrary, if a part of emitting light intensity of the light guide device 60 is relatively low, sizes and densities of the second V-shaped structures 622 can be increased for improving the uniformity of intensity of the emitting light.

Referring to FIG. 3, a base width D1 of each second V-shaped structure 622 is in the range from 10~150 micrometers. Desirably, the width D1 can also be less than 10 micrometers if relatively sophisticated manufacturing technology is adopted. Because the width D1 of the second V-shaped structures 622 is very small, the second V-shaped structures 622 are almost invisible to the human eye when viewed through the liquid crystal display. Therefore, there is no need to add a diffusion sheet to the light guide device 60. This saves energy and reduces costs.

Figure 4:
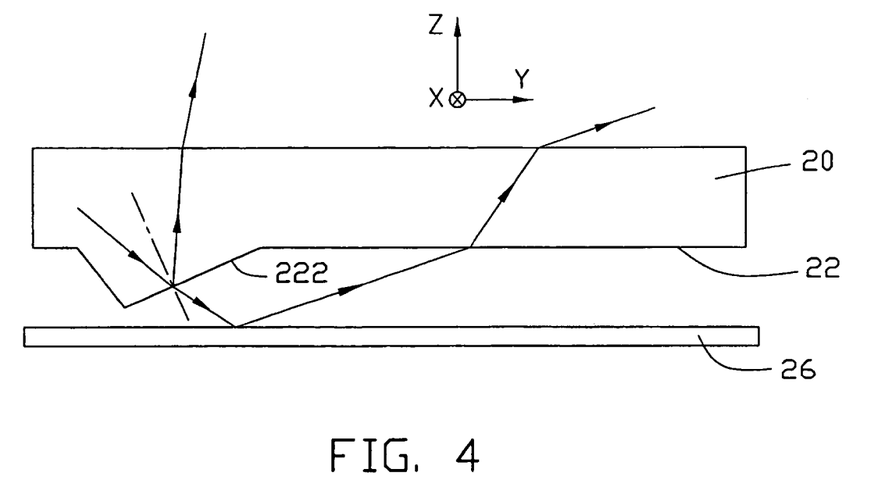
FIG. 4 is a schematic, exploded, side view of a light guide device and a reflecting sheet positioned under a reflecting surface of the light guide device.
Figure 5:
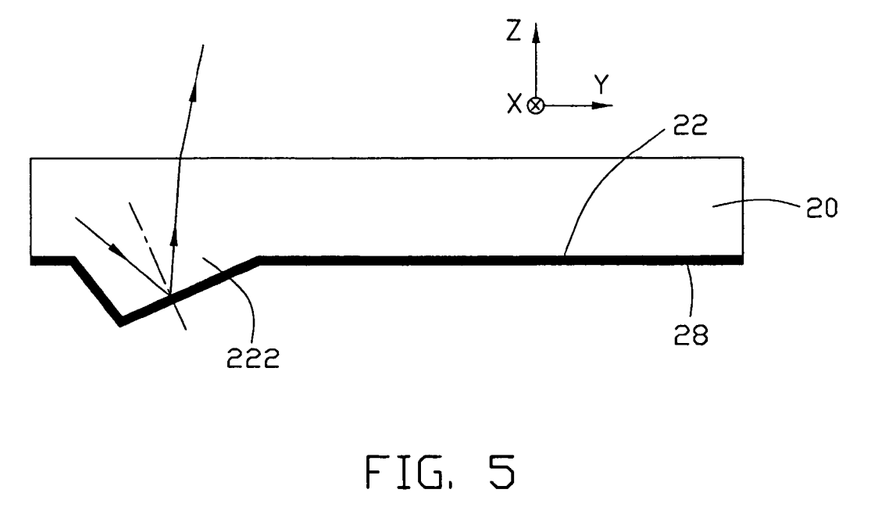
FIG. 5 is a schematic, side view of the light guide device of FIG. 4 with a high reflectivity film formed on the reflecting surface thereof 4.
Figure 6:
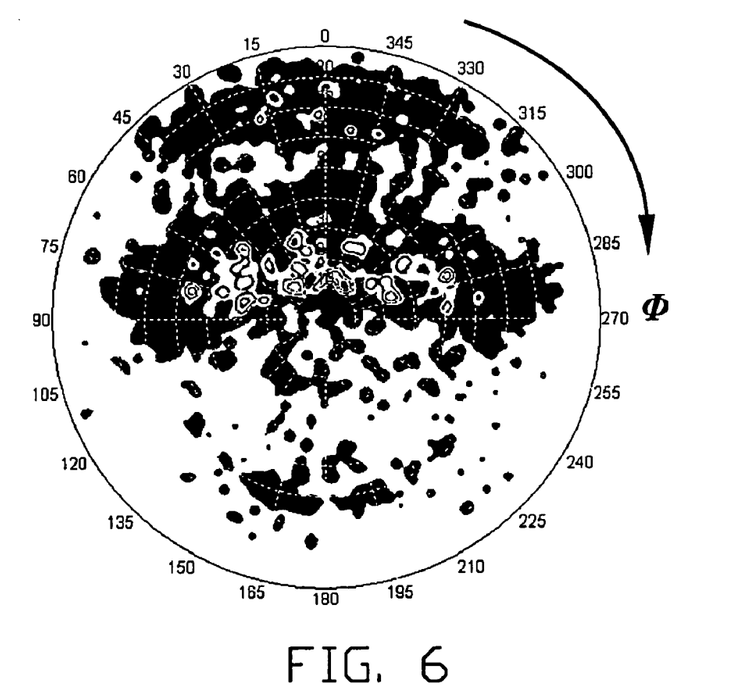
FIG. 6 is a distribution graph of light emitting angles of the light guide device of FIG. 4.

Referring to FIG. 4 and FIG. 5, two experimental apparatuses are provided for comparing light reflecting abilities of a light guide device; first by adding a reflecting sheet to the light guide device, and second by forming a high reflectivity film on the light guide device. In the first apparatus, a light guide device 20 includes a reflecting surface 22, and only one V-shaped structure 222 formed on the reflecting surface 22. A reflecting sheet 26 is positioned under the reflecting surface 22 of the light guide device 20. Referring to FIG. 4, this shows a part of light beams emerging from the light guide device 20 with a large light emitting angle. Referring to FIG. 6, this shows a distribution graph of light emitting angles of the light guide device 20 of FIG. 4. The distribution of light emitting angles is much dispersed.

Figure 7:
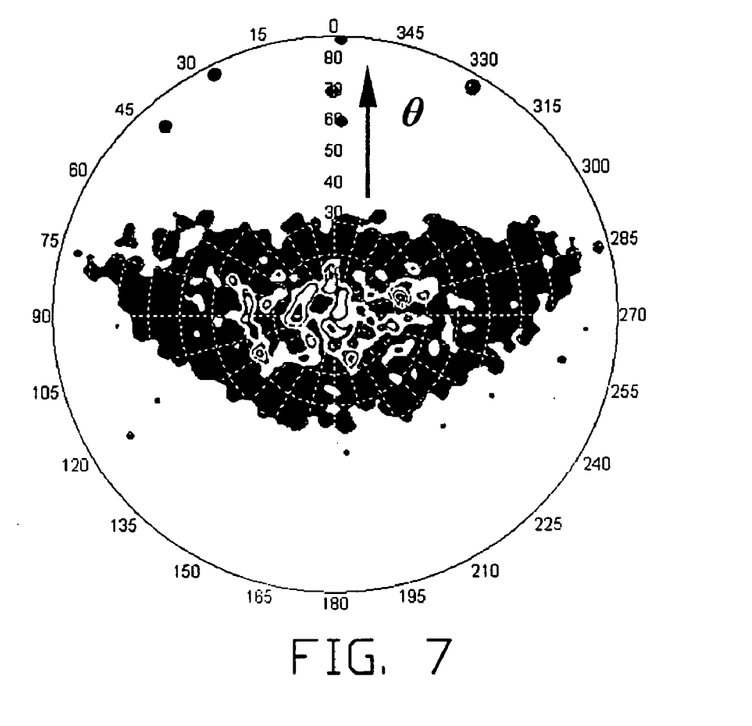
FIG. 7 is a distribution graph of light emitting angles of the light guide device of FIG. 5.

In the second apparatus, the light guide device 20 of FIG. 4 is provided, and a high reflectivity film 28 is formed on the reflecting surface 22 and the V-shaped structure 222 thereon. Referring to FIG. 5, this shows a plurality of light beams emerging from the light guide device 20 with a small light emitting angle. Referring to FIG. 7, this shows a distribution graph of light emitting angles of the light guide device 20 of FIG. 5. The distribution of light emitting angles of FIG. 7 is more concentrated than that of FIG. 6.

Comparing the two apparatuses, it is cleared that the light guide device 60 in accordance with the first preferred embodiment can make light beams emit collectively and improve a light energy utilization rate by forming a high reflectivity film on the reflecting surface 62 and a plurality of second V-shaped structures 622 arranged thereon. In order to further improve a light energy utilization rate, the high reflectivity film can also be formed on three sidewalls of the light guide device 60 other than the incident surface 61. A material of the high reflectivity film is selected from metal films or non-metal films having high reflectivity characteristics, such as aluminum film, silver film, and so on.

Referring to FIG. 1, a backlight module 69 can be provided by adding a light source 66 coupled to the light guide plate 60. The light source 66 is positioned adjacent to the incident surface 61. The light source 66 can be at least one light emitting diode (LED), a cold cathode fluorescent lamp (CCFL), and so on.

If the backlight module 69 uses a plurality of LEDs as a light source, an intensity of incident light adjacent to the incident surface 61 is usually non-uniform, and a plurality of shadows are formed adjacent to the incident surface 61. In order to solve this problem, a light guide device 70 in accordance with a second preferred embodiment of the present invention is provided.

Figure 8:
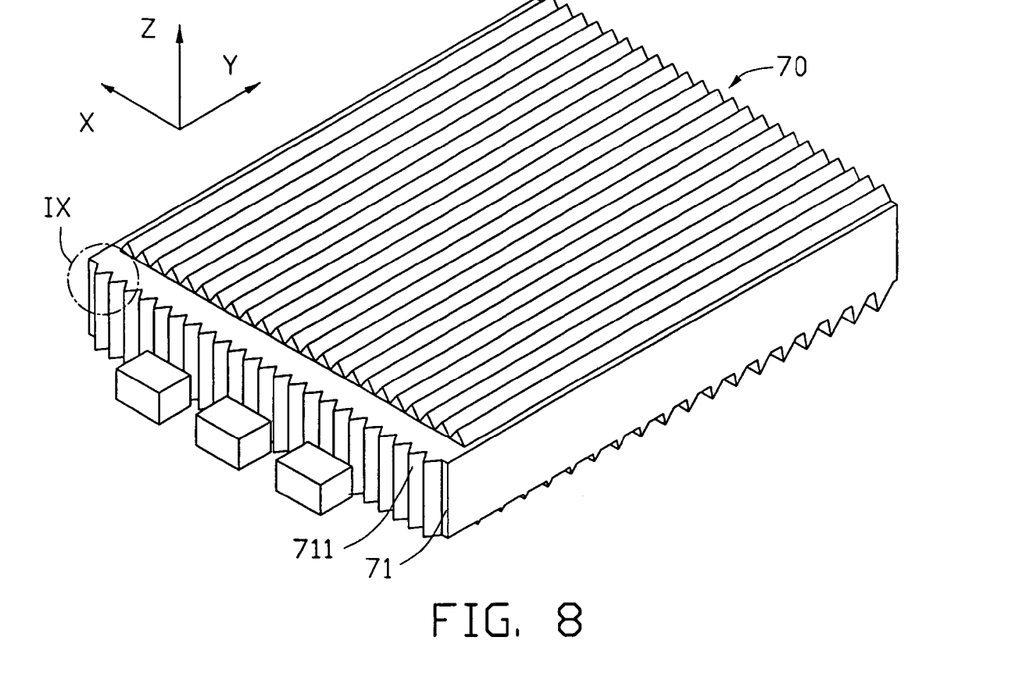
FIG. 8 is an isometric view of a light guide device according to a second preferred embodiment of the present invention.
Figure 9:
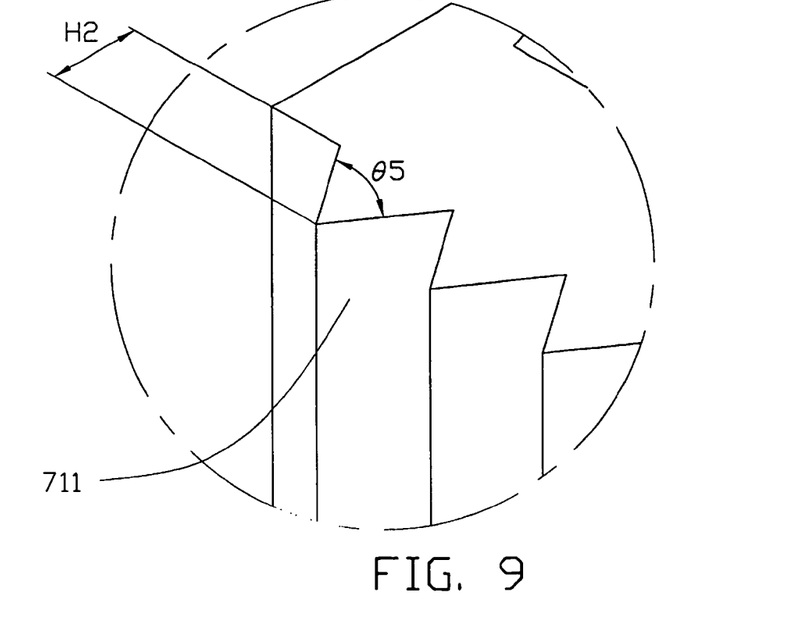
FIG. 9 is an enlarged view of a circled portion IX of FIG. 8.

Referring to FIG. 8 and FIG. 9, a light guide device 70 in accordance with a second preferred embodiment of the present invention is the same as the first embodiment, except that the light guide device 70 further includes a plurality of third V-shaped structures 711 formed on a incident surface 71 thereof. The third V-shaped structures 711 extend out of the incident surface 71 regularly and periodically in a longitudinal direction parallel to a Z-axis. Each of the third V-shaped structures 711 has a rod-shape in the Z-axis sectional view, and a V-shape in an X-axis sectional view. In the X-axis sectional view, each of the third V-shaped structures 711 has an apex angle θ5. The third V-shaped structures 711 have a same height H2 and a same size. In the second preferred embodiment, the angle θ5 is in the range from 70~120 degrees, and the height H2 is in the range from 0~200 micrometers. The third V-shaped structures 711 can eliminate shadows that may otherwise form adjacent to the incident surface 71.

Figure 10:
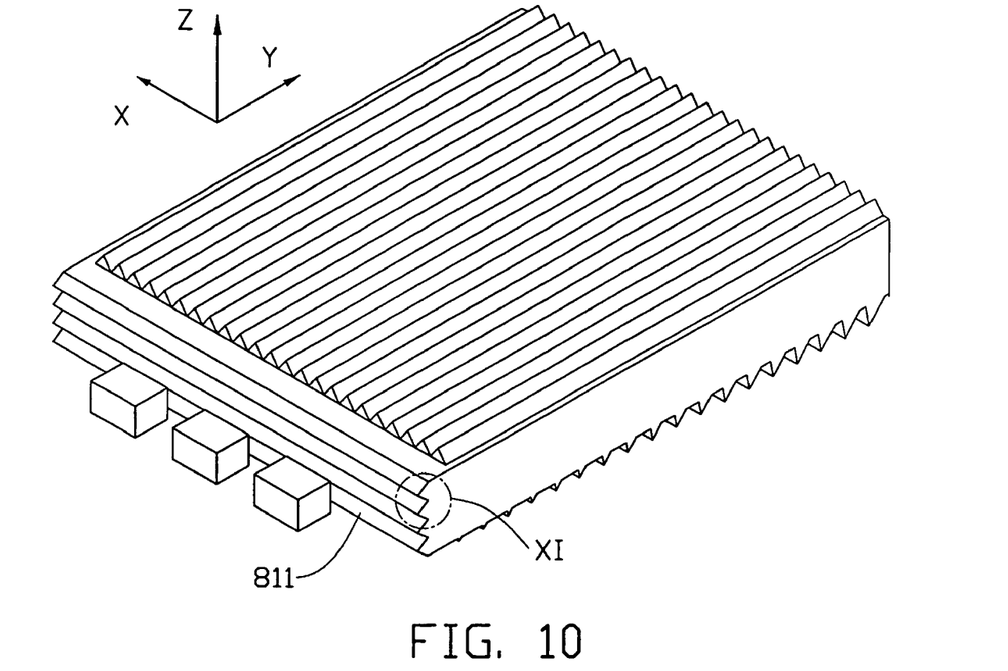
FIG. 10 is an isometric view of a light guide device according to a third preferred embodiment of the present invention.
Figure 11:
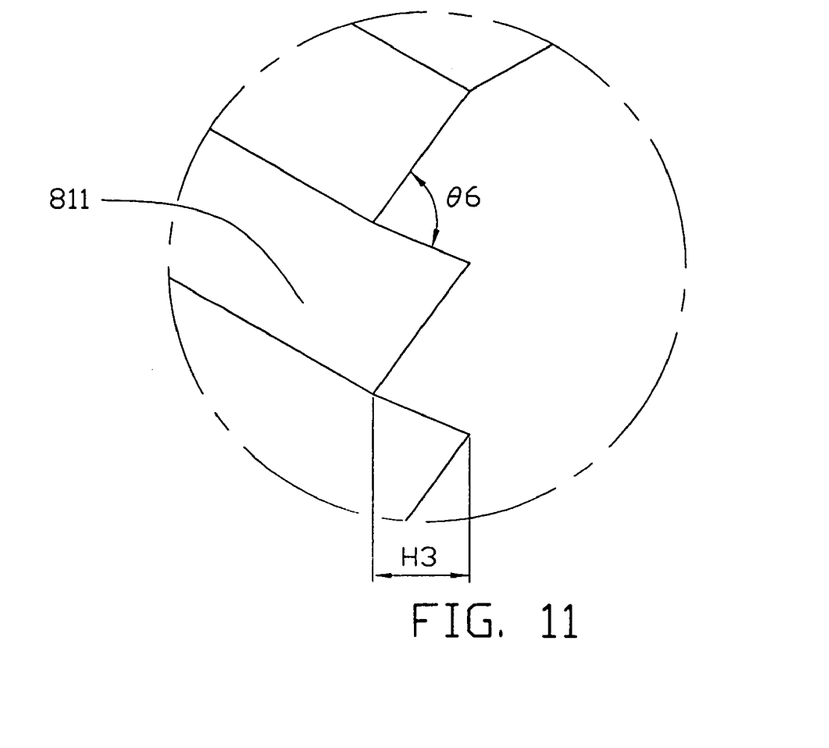
FIG. 11 is an enlarged view of a circled portion XI of FIG. 10.

Referring to FIG. 10 and FIG. 11, a light guide device 80 in accordance with a third preferred embodiment of the present invention is shown. The light guide device 80 is the same as the second embodiment, except that a plurality of third V-shaped structures 811 are in a transverse direction parallel to the X-axis. The third V-shaped structures 811 can also eliminate shadows that may otherwise form.

Aback light module in accordance with a fourth preferred embodiment of the present invention is provided. The backlight module includes a plurality of LEDs and a light guide device. The structure of the light guide device is the same as that of the second preferred embodiment. The light guide device includes an incident surface adjacent to the plurality of LEDs, an emitting surface located at the top of the light guide device adjacent to the incident surface, a reflecting surface opposite to the emitting surface, a plurality of first V-shaped structures formed on the emitting surface, a plurality of second V-shaped structures formed on the reflecting surface perpendicular to the first V-shaped structures, and a plurality of third V-shaped structures formed on the incident surface. A height of each of the first V-shaped structures is 50 micrometers, and an apex angle of each of the first V-shaped structures is 100 degrees. A width of each of the second V-shaped structures is in the range from 10~150 micrometers. An apex angle of each of the third V-shaped structures is 120 degrees, and a width of each of the third V-shaped structures is 0.2 millimeters.

Figure 12:
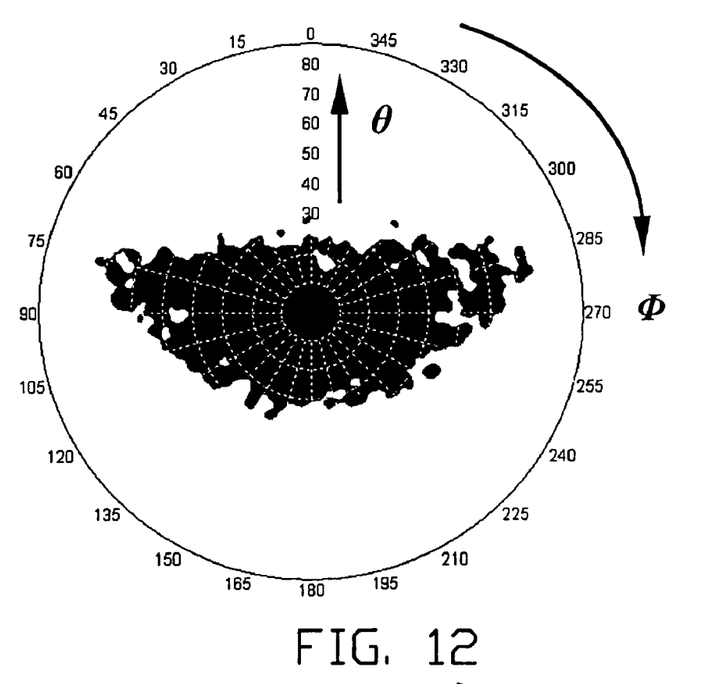
FIG. 12 is a distribution graph of light emitting angles of a light guide device which only has a plurality of second V-shaped structures formed on a reflecting surface thereof, according to a fourth preferred embodiment of the present invention.
Figure 13:
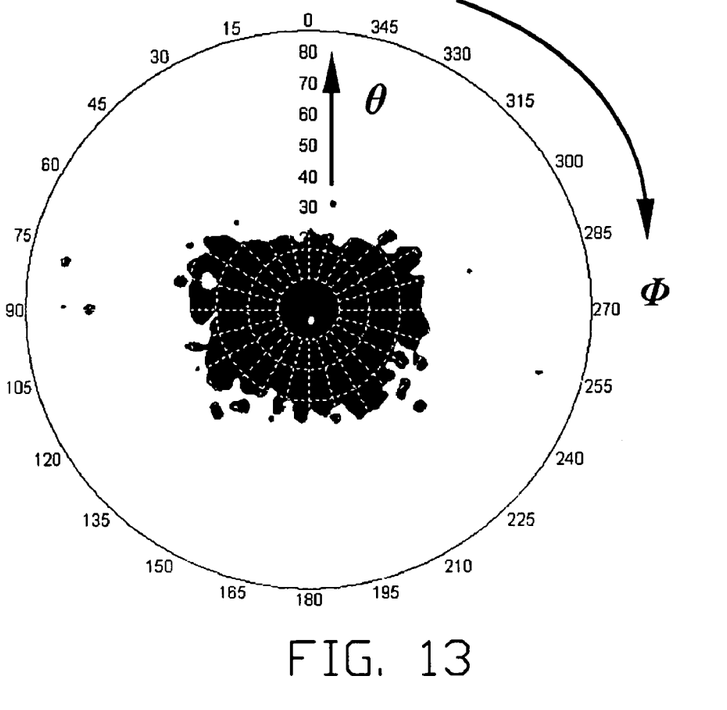
FIG. 13 is a distribution graph of light emitting angles of a light guide device which has a plurality of first V-shaped structures formed on an emitting surface thereof and which also has a plurality of second V-shaped structures formed on a reflecting surface thereof, according to a modified fourth preferred embodiment of the present invention.

In the fourth preferred embodiment, FIG. 12 shows a distribution graph of light emitting angles of the light guide device which only has a plurality of second V-shaped structures formed on the reflecting surface thereof. FIG. 13 shows a distribution graph of light emitting angles of the light guide device which has a plurality of first V-shaped structures formed on the emitting surface thereof, and also has a plurality of second V-shaped structures formed on the reflecting surface thereof. Comparing FIG. 12 and FIG. 13, it is clear that the second V-shaped structures can compress the light emitting angles, thereby reducing reflection and allowing emitted light beams to have an appropriate and efficient distribution.

Figure 14:
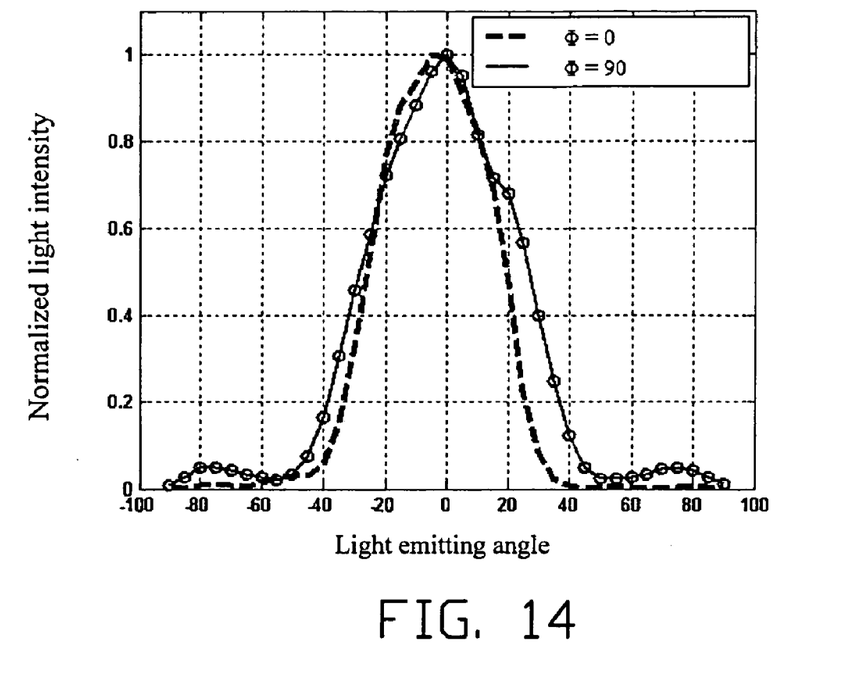
FIG. 14 is a light emitting angle—normalized light intensity graph of a light guide device according to the fourth preferred embodiment of the present invention.

FIG. 14 shows a light emitting angle—normalized light intensity graph in two directions of 0 and 90 degrees of the light emitting angles, in accordance with the fourth preferred embodiment of the present invention. It shows that the light intensity is relatively high when the light emitting angle is in the range from 0~30 degrees, and a plurality of emitting light beams transmit out perpendicular to the emitting surface of the light guide device. Therefore, a light guide device of the present invention can realize the function of a conventional backlight module without the need to add a plurality of optical corrective elements to the light guide device.

Figure 15:
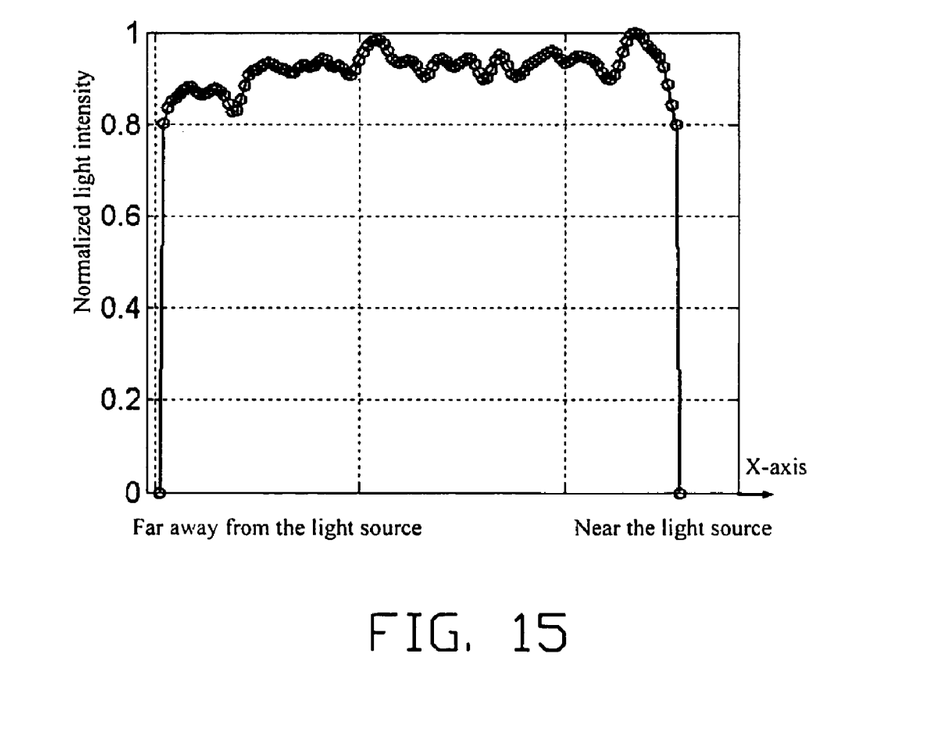
FIG. 15 is an normalized light intensity graph of emitting light in the X-axis direction of a light guide device according to the fourth preferred embodiment of the present invention.
Figure 16:
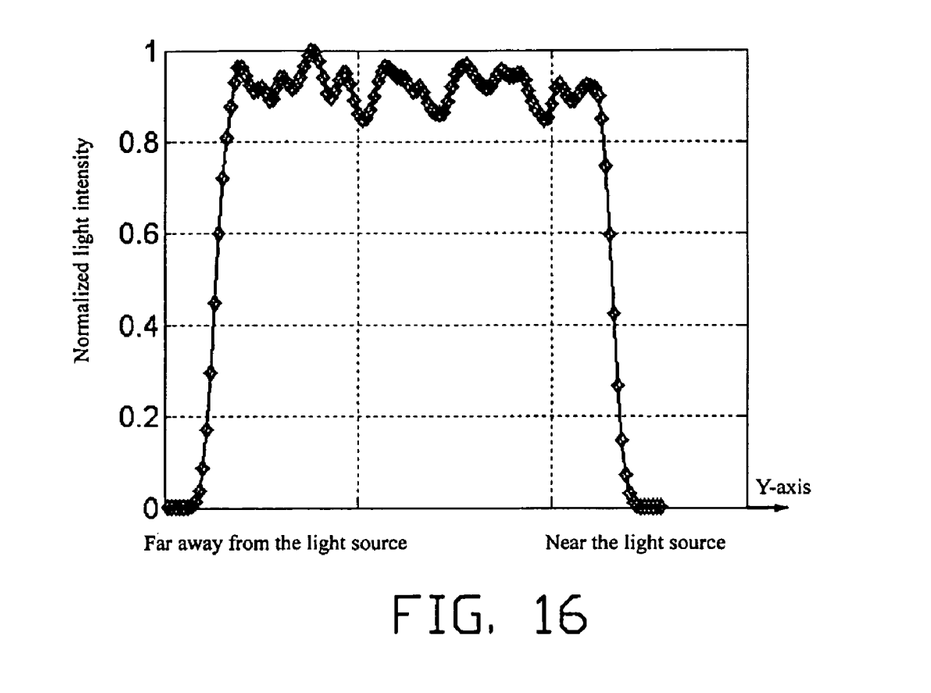
FIG. 16 is an normalized light intensity graph of emitting light in the Y-axis direction of a light guide device according to the fourth preferred embodiment of the present invention.

FIG. 15 and FIG. 16 show two normalized light intensity graphs of emitting light beams respectively in the X-axis and Y-axis directions of a light guide device according to the fourth preferred embodiment of the present invention. It is clear that the light intensities of the two directions have good uniformity, and keep the light intensity over 82 percent uniformly.

Figure 17:
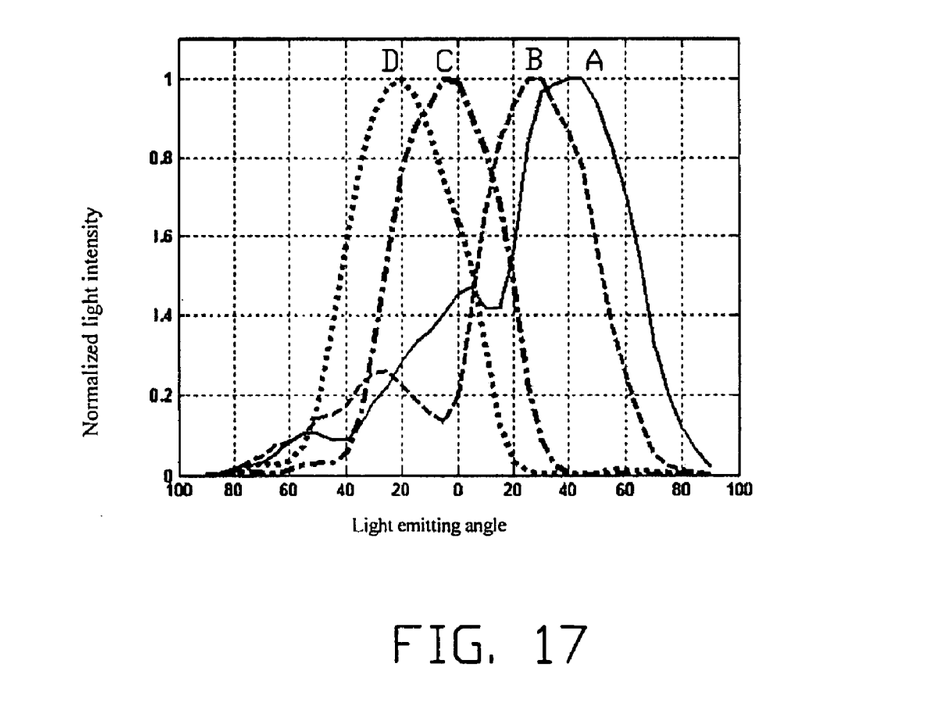
FIG. 17 is a light emitting angle—normalized light intensity graph of different V-shaped structures on the reflecting surface of a light guide device according to the fourth preferred embodiment of the present invention.

Referring to FIG. 17, a highest value of light intensity of the emitting light beams can be conveniently controlled by adjusting sizes and/or densities of the second V-shaped structures. The highest value of the light intensity of an A-line, B-line, C-line, and D-line is respectively 40 degrees, 24 degrees, −2 degrees and −20 degrees. The A-line indicates that the emitting light beams emit far away from the light source. The B-line indicates that the emitting light beams emit similarly perpendicular to the emitting surface. The C-line indicates that the emitting light beams emit similarly perpendicular to the emitting surface and adjacent to the light source. The D-line indicates that the emitting light beams emit aslant to the emitting surface and adjacent to the light source.

It is to be understood that the shape of the light guide device may be flat or wedgy. It is also to be understood that a material of the light guide device is selected from polymethyl methacrylate (PMMA), polycarbonate (PC), and other suitable transparent resin materials.

The preferred light guide device has two different V-shaped structures respectively on the emitting surface and the reflecting surface thereof. The second V-shaped structures enable the light guide plate to control the emitting light beams to emit uniformly and perpendicular to the emitting surface thereof. The light guide plate does not need a plurality of optical corrective elements, and thus has a simple structure. In addition, the third V-shaped structures can eliminate a plurality of shadows that may otherwise form adjacent to the incident surface. Furthermore, the high reflectivity film can improve a light energy utilization rate. Therefore, the light guide device can be advantageously applied in backlight modules of liquid crystal display devices.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A light guide device, comprising:
   an incident surface;
   an emitting surface adjacent to the incident surface;
   a reflecting surface opposite to the emitting surface;
   a plurality of first V-shaped structures formed on the emitting surface; and
   a plurality of second V-shaped structures formed on the reflecting surface and perpendicular to the first V-shaped structures, wherein respective heights of the second V-shaped structures increase with increasing distance from the incident surface, and respective distances between adjacent second V-shaped structures decrease with increasing distance from the incident surface.

2. The light guide device according to claim 1, wherein the shape of each second V-shaped structure is a long V-shaped projection having the same height along the projection.

3. The light guide device according to claim 1, wherein each second V-shaped structure comprises a first base angle θ1 which is in the range from 70~90 degrees, a second base angle θ2 which is in the range from 15~50 degrees, and an apex angle θ3 which is in the range from 40~95 degrees.

4. The light guide device according to claim 1, wherein each first V-shaped structure comprises an apex angle which is in the range from 70~120 degrees.

5. The light guide device according to claim 1, wherein a height of each first V-shaped structure is in the range from 0~200 micrometers.

6. The light guide device according to claim 1, further comprising a plurality of third V-shaped structures regularly and periodically formed on the incident surface thereof.

7. The light guide device according to claim 6, wherein the third V-shaped structures are formed on the incident surface in a longitudinal direction or in a transverse direction.

8. The light guide device according to claim 6, wherein each third V-shaped structure comprises an apex angle which is in the range from 70~120 degrees.

9. The light guide device according to claim 6, wherein a height of each third V-shaped structure is in the range from 0~200 micrometers.

10. The light guide device according to claim 1, further comprising a high reflectivity film formed on the reflecting surface.

11. The light guide device according to claim 10, further comprising three sidewalls, and a high reflectivity film formed on the three sidewalls.

12. The light guide device according to claim 10, wherein a material of the high reflectivity film comprises a metal film or a non-metal film.

13. The light guide device according to claim 12, wherein the metal film comprises an aluminum film or a silver film.

14. The light guide device according to claim 1, wherein the shape of the light guide device is flat or wedgy.

15. The light guide device according to claim 1, wherein a material of the light guide device comprises polymethyl methacrylate, polycarbonate, or another transparent resin material.

16. A backlight module comprising:
a light source; and
a light guide device, comprising:
an incident surface adjacent to the light source;
an emitting surface adjacent to the incident surface;
a reflecting surface opposite to the emitting surface;
a plurality of first V-shaped structures fanned on the emitting surface; and
a plurality of second V-shaped structures formed on the reflecting surface and perpendicular to the first V-shaped structures, wherein respective heights of the second V-shaped structures increase with increasing distance from the incident surface, and respective distances between adjacent second V-shaped structures decrease with increasing distance from the incident surface.

17. The backlight module according to claim 16, wherein the light source comprises at least one light emitting diode or a cold cathode fluorescent lamp.

18. A display device comprising:
a light source capable of providing light for said display device; and
a light guide device disposed next to said light source, and comprising an incident surface facing said light source to accept said light from said light source, an emitting surface for emitting said light out of said light guide device, and a reflecting surface interferingly defined in a traveling path of said light in said light guide device so as to reflect said light toward said emitting surface, a plurality of first protruding structure formed on said emitting surface and each of said plurality of first protruding structures extending along a first direction, and a plurality of second protruding structures formed on said reflecting surface and each of said plurality of second protruding structures extending along a second direction different from said first direction, respective heights of said second protruding structures increasing with increasing distance from said incident surface, and respective distances between adjacent second protruding structures decreasing with increasing distance from said incident surface.

19. The display device according to claim 18, wherein each of said plurality of first protruding structures and each of said plurality of second protruding structures is V shaped in a sectional view thereof, said first and second directions are perpendicular to each other.

20. The display device according to claim 18, wherein a plurality of third protruding structures, arranged parallel to one another, is formed on said incident surface, and each of said plurality of third protruding structures extends along a third direction different from said first direction and said second direction, respectively.

* * * * *